United States Patent
Maeda

(10) Patent No.: US 7,946,662 B2
(45) Date of Patent: May 24, 2011

(54) LINK FOR CONNECTING TRACK SHOE OF CRAWLER BELT, ASSEMBLY FOR CRAWLER BELT, AND CRAWLER BELT

(75) Inventor: Kazuo Maeda, Takatsuki (JP)

(73) Assignee: Komatsu Ltd., Tokyo (JP)

( * ) Notice: Subject to any disclaimer, the term of this patent is extended or adjusted under 35 U.S.C. 154(b) by 43 days.

(21) Appl. No.: 12/281,136

(22) PCT Filed: Apr. 13, 2007

(86) PCT No.: PCT/JP2007/058176
§ 371 (c)(1),
(2), (4) Date: Aug. 28, 2008

(87) PCT Pub. No.: WO2007/119823
PCT Pub. Date: Oct. 25, 2007

(65) Prior Publication Data
US 2009/0026836 A1    Jan. 29, 2009

(30) Foreign Application Priority Data
Apr. 17, 2006   (JP) ................ 2006-113430

(51) Int. Cl.
*B62D 55/20*  (2006.01)
(52) U.S. Cl. .................... 305/198; 305/201
(58) Field of Classification Search .......... 305/185, 305/190, 193, 194, 195, 196, 198, 200, 201; 59/78
See application file for complete search history.

(56) References Cited

U.S. PATENT DOCUMENTS

| | | | | |
|---|---|---|---|---|
| 1,333,175 | A * | 3/1920 | Johnson | 305/191 |
| 3,537,760 | A * | 11/1970 | Kimura et al. | 305/187 |
| 3,717,389 | A * | 2/1973 | Boggs et al. | 152/185.1 |
| 6,485,116 | B1 | 11/2002 | Oertley | |
| 6,846,051 | B2 | 1/2005 | Bottom et al. | |
| 6,866,351 | B2 * | 3/2005 | Yamamoto | 305/185 |

(Continued)

FOREIGN PATENT DOCUMENTS

JP    U64-9885    1/1989

(Continued)

OTHER PUBLICATIONS

Extended European Search Report, dated Apr. 27, 2009 for related Application No./ Patent No. 07741612.1-2425 / 2008920 PCT/JP2007058176.

(Continued)

*Primary Examiner* — Kip Kotter
(74) *Attorney, Agent, or Firm* — Fox Rothschild LLP

(57) ABSTRACT

A track shoe connecting link 25 has shaft holes 31, 32 at both end portions. In the track shoe connecting link 25, a plurality of insertion holes 39 are formed between the shaft holes 31, 32, and window holes 40, 41 are formed so as to correspond to each insertion hole 39. A bolt 43 is inserted through each of the insertion holes 39 and a nut 44 is screwed onto a distal end of the bolt 43 in each of the window holes 40, 41. Accordingly, the track shoe connecting link 25 is fixed to a track shoe 26. The area of the window hole 41 that is adjacent to the second shaft hole 32 is greater than the area of the window hole 40. Accordingly, the rigidity of the track shoe connecting link 25 becomes smaller toward the second shaft hole 32.

5 Claims, 16 Drawing Sheets

U.S. PATENT DOCUMENTS

| | | | |
|---|---|---|---|
| 7,219,968 B2 * | 5/2007 | Hisamatsu | 305/198 |
| 2003/0122423 A1 * | 7/2003 | Banerjee et al. | 305/159 |
| 2003/0141760 A1 | 7/2003 | Yamamoto | |
| 2003/0151305 A1 * | 8/2003 | Yoshida et al. | 305/157 |

FOREIGN PATENT DOCUMENTS

| | | |
|---|---|---|
| JP | 1-76380 | 5/1989 |
| JP | U1-76380 | 5/1989 |
| JP | 2003127916 | 5/2003 |
| JP | 2003220983 | 8/2003 |
| JP | 2003301887 | 10/2003 |
| JP | 2004060003 | 2/2004 |
| JP | 2004249973 | 9/2004 |
| WO | 9311020 | 6/1993 |

OTHER PUBLICATIONS

Korean Office Action dated Aug. 12, 2010, for related Korean Application No. 10-2008-7021607.

* cited by examiner

LINK FOR CONNECTING TRACK SHOE OF CRAWLER BELT, ASSEMBLY FOR CRAWLER BELT, AND CRAWLER BELT

FIELD OF THE INVENTION

The present invention relates to a track shoe connecting links of a crawler belt in a crawler-type work machine, a crawler belt assembly including the track shoe connecting links of a crawler belt, and a crawler belt provided with the crawler belt assembly.

BACKGROUND OF THE INVENTION

Generally, a crawler belt of a crawler-type work machine such as a bulldozer or a hydraulic excavator is formed by connecting a plurality of assemblies for a crawler belt in a loop. The crawler belt assembly has a pair of connecting links and a track shoe that is fixed to the connecting link pair. The connecting link pair includes a parallel pair of track shoe connecting links. The crawler belt is wound around a drive wheel and an idler wheel that are arranged in a body frame of the crawler-type work machine with a predetermined distance therebetween. A plurality of carrier rollers and track rollers are supported to the body frame between the drive wheel and the idler wheel. Each of the crawler belt assemblies is engaged to a sprocket of the drive wheel, and when the drive wheel is rotated in this state, the crawler belt is moved while being supported by the carrier rollers and the track rollers.

A crawler belt assembly, for example, disclosed in Patent Document 1, has been conventionally known. In the crawler belt assembly disclosed in the document, a track shoe is fixed to a pair of connecting links. A support shaft is fixed to end portions at one end of a pair of track shoe connecting links, which form the connecting link pair, and a sleeve is fixed to the other end portions. The support shaft is rotatably inserted through the sleeve of an adjacent crawler belt assembly. Accordingly, a plurality of crawler belt assemblies are connected to each other to form a loop of a crawler belt.

In the above-described crawler belt, the sleeve functions as a bearing member that rotatably connects the adjacent crawler belt assemblies to each other and also functions as a power transmission member that receives power transmitted from a sprocket by being engaged with the drive wheel. However, since the sleeve is fixed to the connecting link pair in the related art crawler belt assembly, the sleeve receives high bearing pressure in a specific portion and slidingly contacts a tooth surface of the sprocket when the work machine moves backward. Therefore, the sleeve of each crawler belt assembly may be unevenly worn at a relatively early stage. When this happens, the support shaft of the sleeve that is fixed to the support shaft is forcibly moved with respect to the support shaft so as to be turned over (this operation is referred to as bushing turn). However, the turning operation is troublesome and increases the running cost.

To solve such a problem, for example, a crawler belt assembly disclosed in Patent Document 2 has been proposed. In the crawler belt assembly, the sleeve provided between the track shoe connecting links is divided into three portions in an axial direction of the sleeve. The two end portions of the sleeve is fixed to shaft holes formed in end portions of the track shoe connecting links and a middle portion of the sleeve is externally fitted to the support shaft of an adjacent crawler belt assembly so as to be rotatable. Accordingly, relative sliding of the sprocket and the sleeve is allowed when the sleeve is engaged to the teeth of the sprocket. This prevents the wearing of the sleeve at the early stage.

Patent Document 1: Japanese Laid-Open Patent Publication No. 2004-249973
Patent Document 2: Japanese National Phase Laid-open Patent Publication No. 6-504747

SUMMARY OF THE INVENTION

In the configuration disclosed in Patent Document 1, the crawler belt assembly has a pair of track shoe connecting links, a support shaft fixed to end portions at one end of the links, and the sleeve fixed to the other end portions of the links, and has a closed rectangular structure having four sides. In the configuration disclosed in Patent Document 2, the crawler belt assembly has a pair of track shoe connecting links and a support shaft fixed to end portions at one end of the links, and has a structure having three sides with an open front side or an open rear side. In the configuration disclosed in Patent Document 2, the strength of the connecting links is less and the strength of the entire crawler belt is less than the configuration disclosed in Patent Document 1. In other words, if a force acts on the open portion of the crawler belt assembly so as to enlarge the open portion, stress is concentrated on portions of the links adjacent to the support shaft and the track shoe connecting link may be damaged.

An objective of the present invention is to provide a track shoe connecting link of a crawler belt that prevents damage of the link due to a concentrated stress on a specific portion, and to provide a crawler belt assembly having the track shoe connecting links and a crawler belt having the crawler belt assembly.

To solve the above problem, a first aspect of the invention provides a track shoe connecting link of a crawler belt. The track shoe connecting link has a pair of shaft holes formed on two end portions and an insertion hole. The shaft holes open in a same direction. The insertion hole is formed between the shaft holes and opens in a direction perpendicular to center axes of the shaft holes. The track shoe connecting link is fixed to a track shoe by a bolt inserted through the insertion hole and a nut screwed to the bolt. Adjacent track shoe connecting links are connected to each other with a shaft in the shaft hole to form a loop shaped crawler belt. In the track shoe connecting link, the shaft holes have different diameters and a portion of the track shoe connecting link in which the shaft hole of a large diameter is located has a small rigidity.

According to the above configuration, even in a crawler belt assembly having the track shoe connecting links arranged parallel to each other and the support shaft fixed to the shaft hole that is adjacent to one end portion of the track shoe connecting link, and having a three-side structure with one side being open, since the stress concentration on a specific portion is prevented, the stress is dispersed over the entire track shoe connecting link. This prevents damage of the track shoe connecting link due to the stress concentration.

The track shoe connecting link further has an accommodation space that corresponds to the insertion hole and accommodates a head portion of the bolt or the nut. It is preferable that the shape of the accommodation space be set such that the rigidity of the track shoe connecting link becomes smaller toward the shaft hole of the large diameter. Accordingly, the rigidity of the track shoe connecting link is adjusted with a simple structure.

The track shoe connecting link further has a plurality of insertion holes, and the accommodation space has a plurality of window holes provided so as to correspond to each insertion hole, and the area of the window hole adjacent to the shaft hole of the large diameter is greater than the area of other window hole. In this case, the rigidity of the track shoe connecting link is made smaller toward the shaft hole of the large diameter by changing the size of the window holes.

In the track shoe connecting link, the height of the window hole adjacent to the shaft hole of the large diameter is greater than the height of other window hole. In this case, the rigidity of the track shoe connecting link is adjusted without changing the distance between the shaft holes of the track shoe connecting link.

To solve the above problem, a second aspect of the present invention provides a crawler belt assembly comprising a connecting link pair having a pair of track shoe connecting links, and a track shoe. The track shoe connecting links are provided in parallel to each other. The track shoe is fixed to the connecting link pair by bolts that are inserted through insertion holes of the track shoe connecting links. A support shaft fixed to shaft holes of a small diameter in the track shoe connecting links, and a sleeve supported to shaft holes of a large diameter of the track shoe connecting link. The sleeve is externally fitted to support shaft of adjacent connecting link pair so as to be rotatable.

To solve the above problem, a third aspect of the present invention provides a track shoe wherein the support shaft of the above described crawler belt assembly is inserted through and supported by the shaft hole of the large diameter of the adjacent crawler belt assembly in a state that the support shaft is externally fitted to the sleeve.

According to the above configuration, in the track shoe connecting links, the rigidity of the track shoe connecting links can be continuously increased toward the support shaft from the sleeve. Therefore, in the track shoe connecting links, even if a force acts on the end portions adjacent to the shaft holes of the large diameter so as to enlarge the space between the track shoe connecting links, stress concentration on a specific portion is prevented.

In the crawler belt assembly, reinforcing means for reinforcing the track shoe connecting link is provided between the track shoe connecting links. In this case, damage of the track shoe connecting link is effectively prevented.

The crawler belt assembly further has a grouser provided on an outer surface of the track shoe and extending along a side edge of the track shoe, and the grouser is provided so as to correspond to the shaft hole of the large diameter of the connecting link pair. In this case, the grouser reinforces strength of the open side of each crawler belt assembly having a three-side structure.

In the crawler belt assembly, the reinforcing means is fixed to the connecting links by the bolts. This suppresses damage of the track shoe connecting link due to the stress concentration. Therefore, a crawler belt can be used for an extended period of time.

DETAILED DESCRIPTION OF THE PREFERRED EMBODIMENTS

First Embodiment

A first embodiment of the present invention will now be described with reference to FIGS. 1 to 6. In the description of a track shoe connecting link according to the present invention, a front side and rear side are defined as shown in FIGS. 1 and 2.

Figure 1:
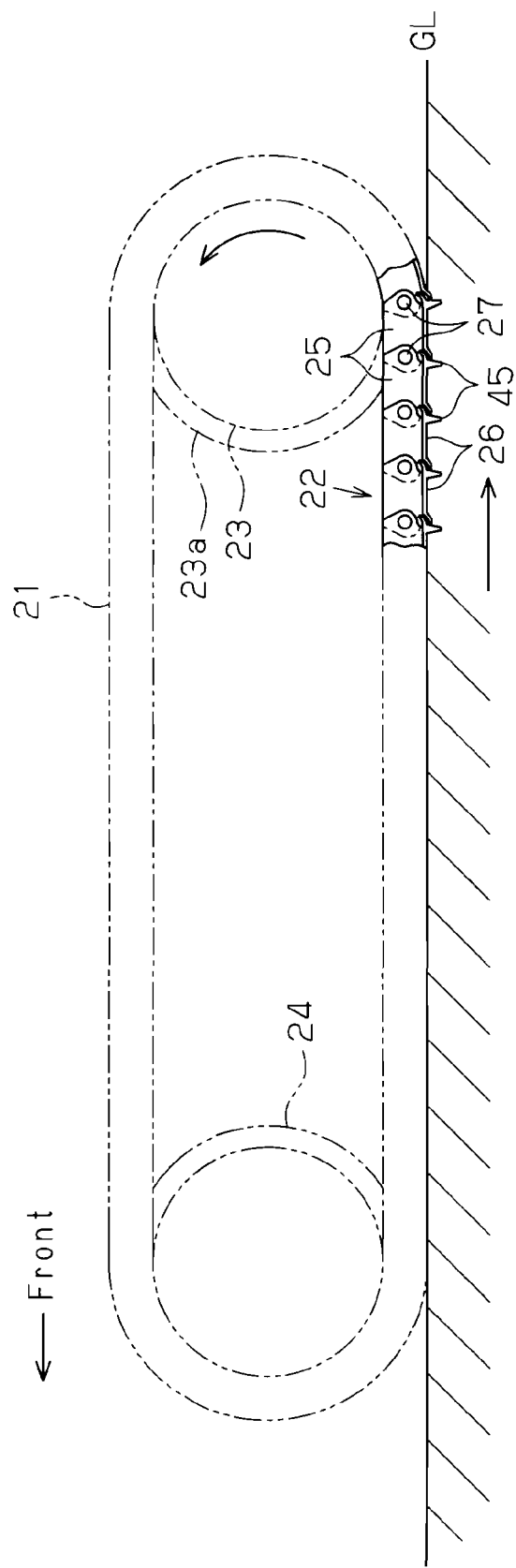
FIG. 1 is a front view showing a crawler belt having a crawler belt assembly having track shoe connecting links according to a first embodiment of the present invention.
Figure 2:
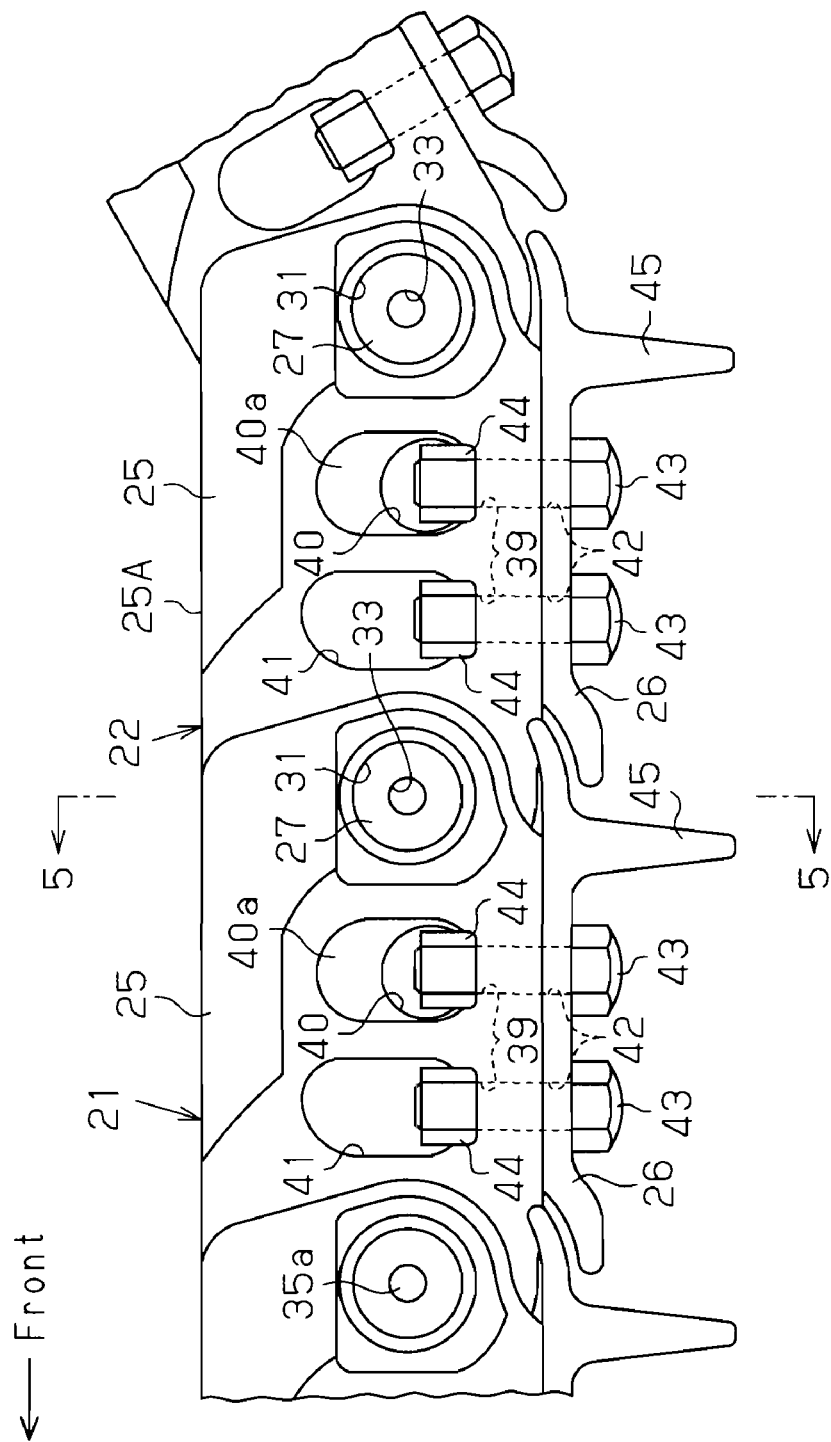
FIG. 2 is an enlarged front view showing a portion of the crawler belt that contacts a ground.
Figure 3:
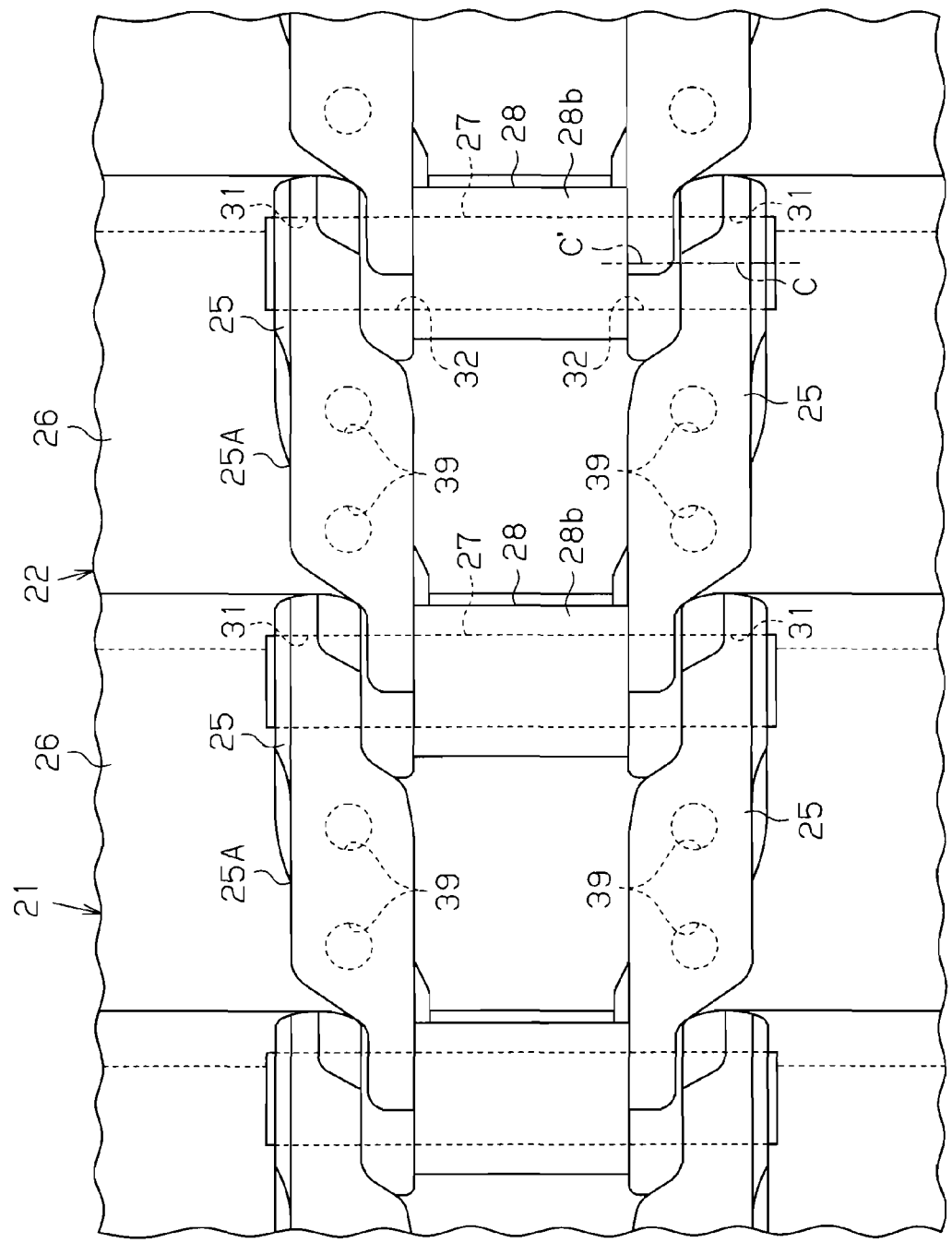
FIG. 3 is a plan view partially showing the crawler belt.

As shown in FIG. 1, a crawler belt 21 is formed by connecting a plurality of assemblies 22 for a crawler belt in a loop. The crawler belt 21 is wound around a drive wheel 23 and an idler wheel 24 that are respectively arranged at a rear side and a front side in a body frame of a crawler-type work machine such as a bulldozer or a hydraulic excavator with a predetermined distance therebetween. In this state, each of the crawler belt assemblies 22 is meshed with sprocket teeth 23A of the drive wheel 23. Each of the crawler belt assemblies 22 moves around an outer surface of the drive wheel 23 and the idler wheel 24. A plurality of carrier rollers and track rollers (not shown) are supported by the body frame between the drive wheel 23 and the idler wheel 24. The crawler belt 21 moves while being supported by the carrier rollers and the track rollers such that the work machine runs on the ground GL.

As shown in FIGS. 2 to 5, each of the crawler belt assemblies 22 has a pair of connecting link pair 25A and a track shoe 26 that is fixed to the connecting link pair 25A. The connecting link pair 25A includes a pair of parallel links 25 for connecting a track shoe. Each of the track shoe connecting links 25 includes a pair of end portions 29. A support shaft 27 is fixed to the end portions at one end of the track shoe connecting links 25 and a sleeve 28 is provided to the end portions of the other side of the track shoe connecting links 25. The sleeve 28 is externally fitted to the support shaft 27 of an adjacent connecting link pair 25A so as to be rotatable. The sleeve 28 is externally fitted to the support shaft 27 such that the adjacent connecting link pair 25A is rotatably connected to each other via the support shaft 27 and the crawler belt 21 of a loop state is formed.

Each of the track shoe connecting links 25 and a related configuration thereof will now be explained in details.

Figure 4:
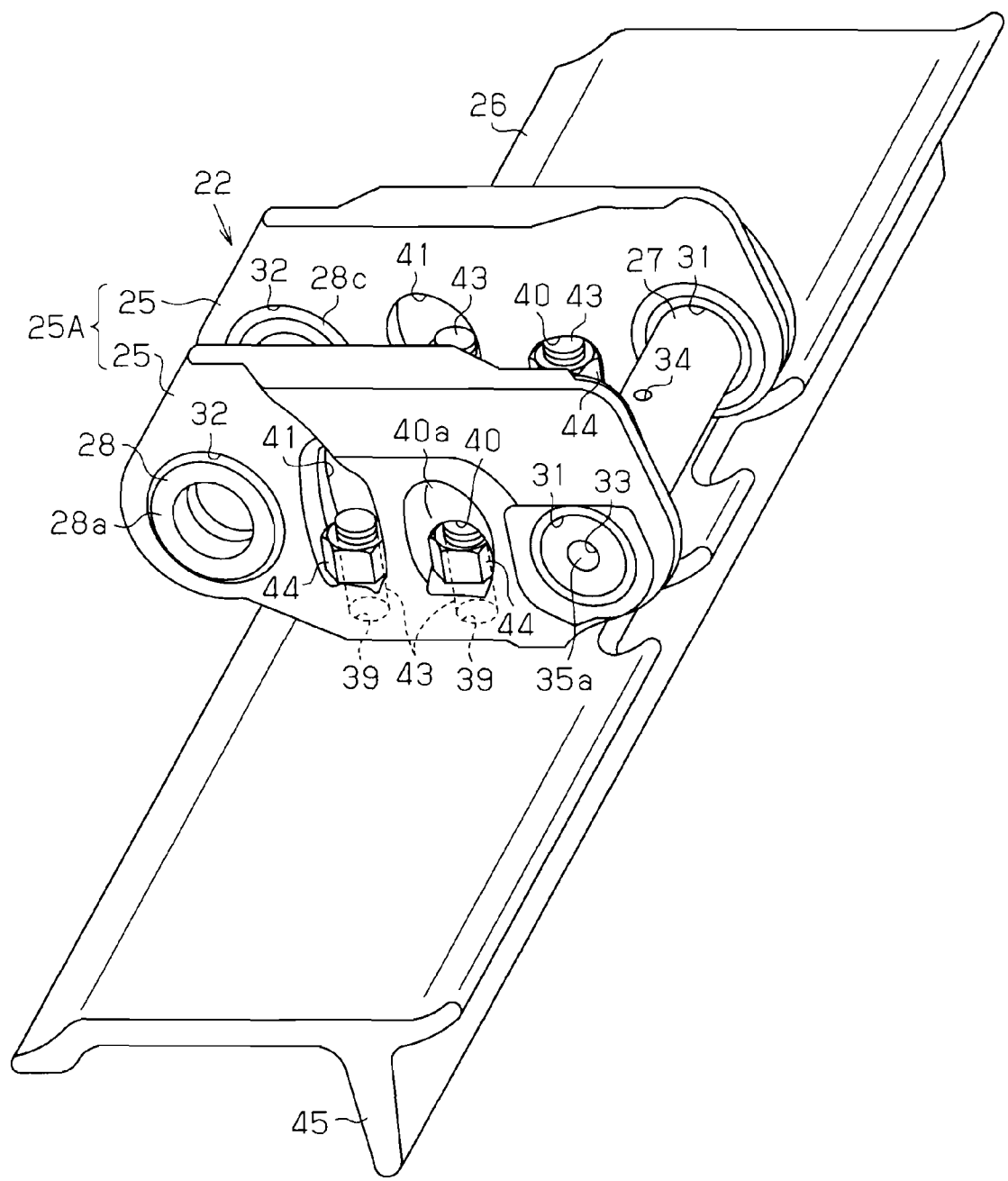
FIG. 4 is a perspective view showing the crawler belt assembly.
Figure 5:
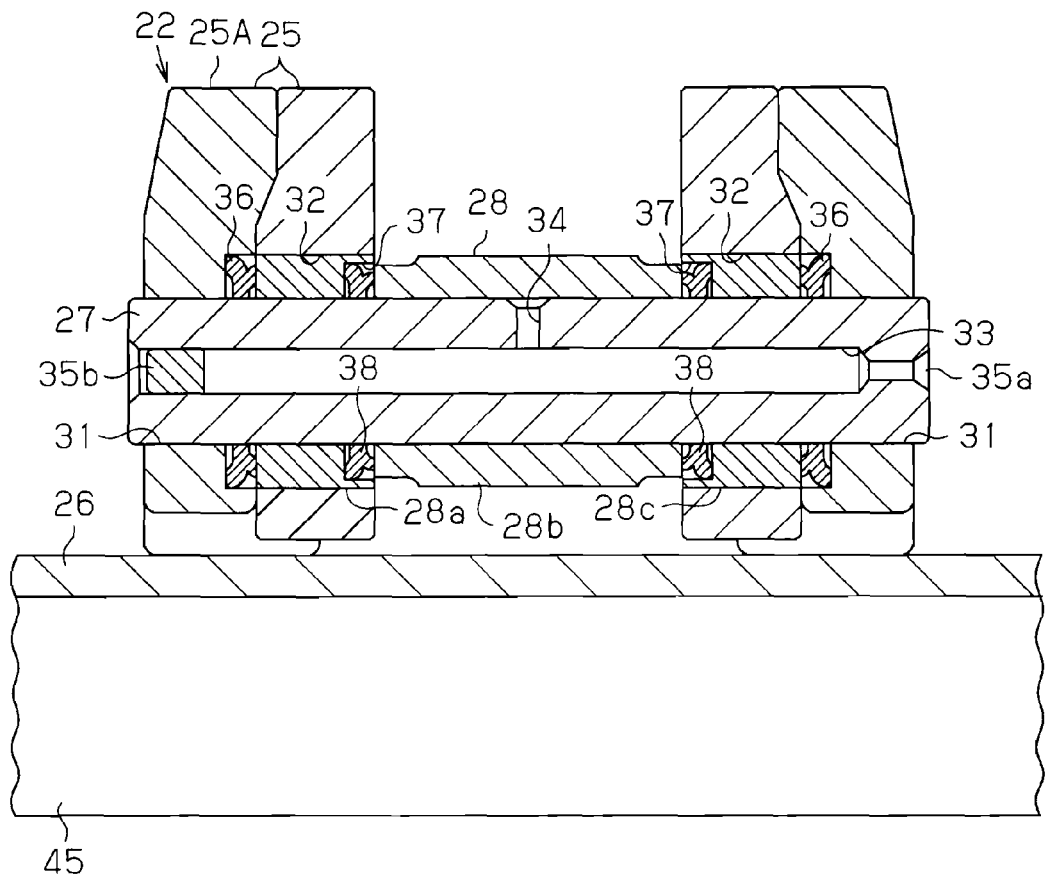
FIG. 5 is a cross-sectional view of FIG. 2 taken along line 5-5.
Figure 6:
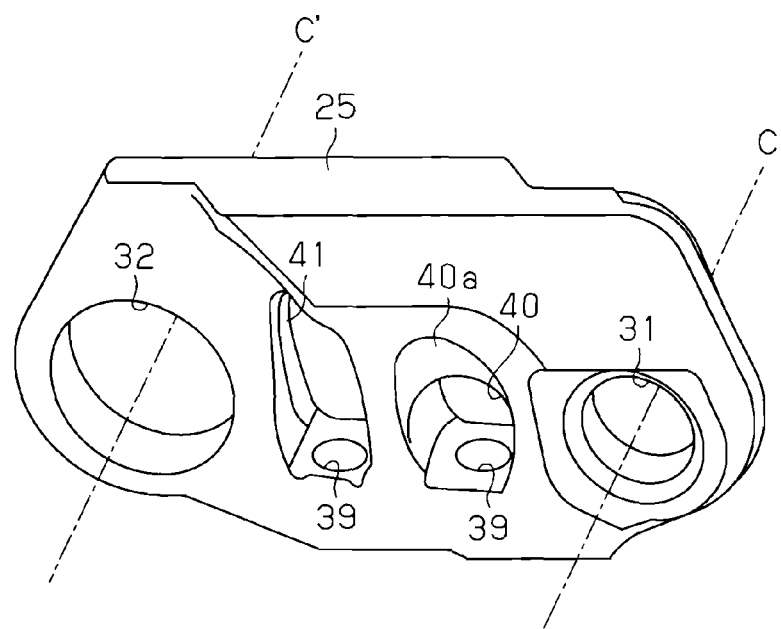
FIG. 6 is a perspective view showing the track shoe connecting link.

As shown in FIGS. 4 to 6, a pair of shaft holes 30, which includes individual shaft holes 31, 32, are formed on two end portions of each track shoe connecting link 25 so as to be open in the same direction. The shaft holes 31, 32 have center axial lines C, C', respectively. The center axial lines C and C' are parallel to each other. The first shaft hole 31 has a relatively small diameter such that an end portion of the support shaft 27 is pressed into and fixed to the first shaft hole 31. The second shaft hole 32 has a relatively large diameter such that the end portion of the sleeve 28 is inserted through and supported by the second shaft hole 32. The sleeve 28 is divided into three portions 28a, 28b, 28c along its axis.

The two end portions 28a, 28c of the sleeve 28 are pressed into and fixed by the second shaft hole 32 of each track shoe connecting link 25. The track shoe connecting links 25 of the connecting link pair 25A are arranged at an inner side of the track shoe connecting links 25 of the adjacent connecting link pair 25A at a portion near the second shaft hole 32. In this state, the sleeve 28 of the connecting link pair 25A is externally fitted to the support shaft 27 of the adjacent connecting link pair 25A so as to be rotatable. In this state, the sprocket of the drive wheel 23 is engaged to the middle portion 28b. This suppresses uneven wear of the sleeve 28 that is caused by the sliding between the teeth 23a of the sprocket and the sleeve 28 when they are engaged to each other and prevents abrasion of the middle portion 28b. Since the sleeve 28 is divided into the three portions, the connecting link pair 25A and the support shaft 27 have a three-side structure having the sleeve 28 being open.

As shown in FIG. 5, a lubricant reserving hole 33 is formed in the support shaft 27 so as to extend in an axial direction of the support shaft 27. A lubricant supplying hole 34 is formed in the support shaft 27 so as to extend from the middle portion of the lubricant reserving hole 33 to an outer peripheral surface of the support shaft 27. Closing plugs 35a, 35b are fitted to the two end portions of the lubricant reserving hole 33. Lubricant is injected into the lubricant reserving hole 33 from an end portion of the lubricant reserving hole 33. Accordingly, the lubricant is supplied to a space between the outer peripheral surface of the support shaft 27 and the inner peripheral surface of the middle portion 28b of the sleeve 28. Accordingly, a sliding property between the support shaft 27 and the sleeve 28 is ensured.

As shown in FIG. 5, first seal rings 36 are provided at an inner side of the second shaft hole 32 and at an outer side of the connecting link pair 25A. The first seal rings 36 are provided between an outer surface of the two end portions 28a, 28c of the sleeve 28 and inner surfaces of the adjacent track shoe connecting links 25. Recesses 37 are formed in the inner surface of the two end portions 28a, 28c of the sleeve 28. Second seal rings 38 are provided at an inner side of each recess 37 so as to be joined to the end surfaces of the middle portion 28b of the sleeve 28. The seal rings 36, 36, 38, 38 suppress leaking of the lubricant from the two end portions of the support shaft 27.

As shown in FIGS. 2, 4 and 6, a pair of insertion holes 39 are formed in each track shoe connecting link 25 with the distance therebetween. Each insertion hole 39 is located between the shaft holes 31, 32 of each track shoe connecting link 25. Each insertion hole 39 opens to a direction perpendicular the opening direction of each shaft hole 31, 32. In other words, a center axis of each insertion hole 39 is perpendicular to a center axis C, C' of each shaft hole 31, 32. Two window holes 40, 41 are formed at a center of the track shoe connecting link 25 as an accommodation space. Each window hole 40, 41 communicates with the corresponding insertion hole 39. Each window hole 40, 41 opens to a direction that is substantially same as a center axis of each shaft hole 31, 32. The height of the window hole 41 that is adjacent to the second shaft hole 32 is set relatively great such that an open area of the window hole 41 is greater than that of the window hole 40 that is adjacent to the first shaft hole 31. The open area means an area of an open portion that can be seen from an extended line of the center axis of each shaft hole 31, 32. A thin portion 40a is formed at an upper portion of the window hole 40 that is adjacent to the first shaft hole 31. The rigidity of the track shoe connecting link 25 is set by the shape of each window hole 40, 41 such that the rigidity of a portion adjacent to the second shaft hole 32 is less than that of a portion adjacent to the first shaft hole 31. In other words, the rigidity of the track shoe connecting links 25 of the assembly 22 for crawler belt is set to be greater toward the support shaft 27 where stress is likely to be concentrated. The thin portion or the recess such as the thin portion 40a is connected to a thick portion via an arc having a predetermined diameter to prevent the stress concentration on a specific portion of the track shoe connecting link 25.

As shown in FIGS. 2 and 4, a pair of insertion holes 42 are formed in the track shoe 26 so as to correspond to each insertion hole 39 of each track shoe connecting link 25. A bolt 43 is inserted through the insertion hole 42 of the track shoe 26 and the insertion hole 39 of each track shoe connecting link 25 from an outer surface of the track shoe 26 (the lower side in FIG. 2). A nut 44 that is arranged in the window hole 40, 41 is screwed to the distal end of the bolt 43. The bolts 43 and the nuts 44 fix the track shoe 26 to the outer surface of the connecting link pair 25A.

Grousers 45 are formed on a surface of the crawler belt 21 that contacts the ground so as to extend along the width direction of the crawler belt 21. Each grouser 45 is provided along a rear end portion of the track shoe 26 (the right side in FIG. 4) and is projected from a surface of the track shoe 26 that is opposite to a surface where the links are provided. The track shoe 26 is fixed to the connecting link pair 25A by the bolts 43 and the nuts 44. Accordingly, the grouser 45 is arranged near the first shaft holes 31 of the track shoe connecting links 25. That is, the grouser 45 is arranged adjacent to a closed portion of the connecting link pair 25A (the support shaft—the link connecting portion) having a three-side structure that is formed by the two track shoe connecting links 25 and the support shaft 27.

As explained above, in each track shoe connecting link 25 of the crawler assembly 22 according to the present embodiment, the window hole 41 adjacent to the open side of the connecting link pair 25A is formed to be larger than the window hole 40 adjacent to the first shaft hole 31. Accordingly, the rigidity of the track shoe connecting links 25 becomes smaller toward the open side of the connecting link pair 25A between the first shaft hole 31 and the second shaft hole 32. That is, since the connecting link pair 25A is an open type having a three-side structure, the rigidity of the open side of each track shoe connecting link 25 is small. In the present embodiment, each of the window holes 40, 41 has a different shape such that the rigidity of a portion of each track shoe connecting link 25 in which the second shaft hole 32 is located is less than the rigidity of a portion in which the first shaft hole 31 is located. Therefore, even in the crawler belt assembly 22 having the parallel track shoe connecting links 25 and the support shaft 27 fixed between the track shoe connecting links and having a three-side structure with one side being open, since the stress concentration on a specific portion is suppressed, the stress can be dispersed over the entire track shoe connecting link 25. Therefore, even if a force acts on end portions of the track shoe connecting links 25 adjacent to the second shaft holes 32 to enlarge the space between the end portions, and a stress acts on an end portion of each track shoe connecting link 25 adjacent to the support shaft 27, the stress is borne by the entire track shoe connecting link 25. This prevents damage of the track shoe connecting link 25.

According to the first embodiment, the following advantages are obtained.

(1) In each track shoe connecting link 25, since the stress concentration on a specific portion is suppressed, damage of the track shoe connecting link 25 and the support shaft 27 is prevented. Therefore, the strength of the entire crawler belt 21 is improved.

(2) The stress concentration on a specific portion of each track shoe connecting link 25 is prevented only by changing the open area of each window hole 40, 41. This only requires a small design change. Since the number of parts is not increased, the weight of the device is prevented from increasing.

(3) The open area of the window hole 41 is enlarged by increasing the height of the window hole 41 adjacent to the second shaft hole 32. With this method, the rigidity of the track shoe connecting link 25 can be adjusted without changing the distance between the shaft holes 31, 32 in the track shoe connecting link 25. Therefore, the width of the track shoe 26 and the pitch of the teeth 23a of the drive wheel (drive sprocket) 23 do not need to be changed. Therefore, the configuration of the first embodiment can be applied to the configuration of the conventional work machine.

Second Embodiment

Next, a second embodiment of the present invention will now be described. The differences from the first embodiment will mainly be discussed.

Figure 7:
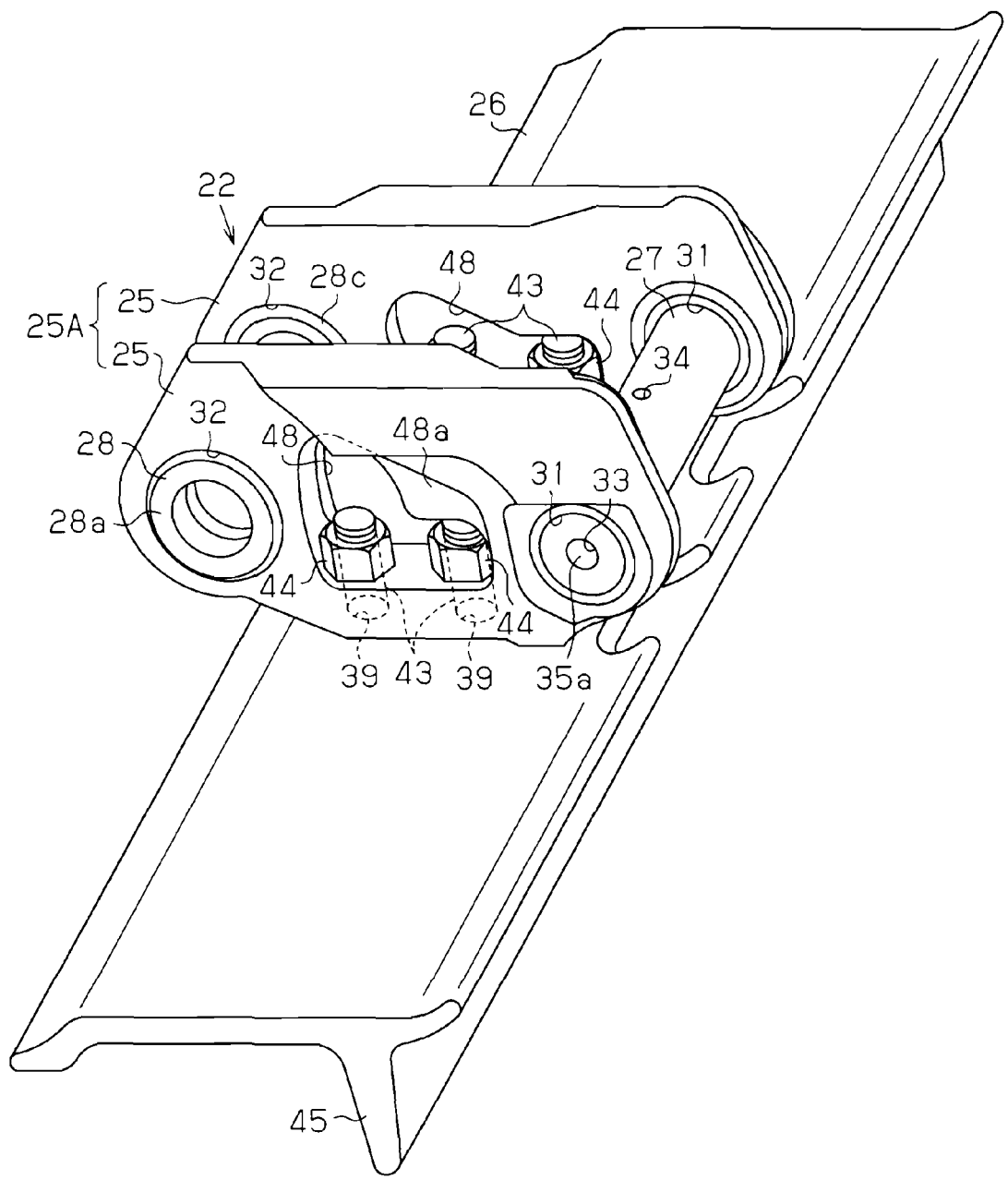
FIG. 7 is a perspective view showing a crawler belt assembly having a track shoe connecting link according to a second embodiment.

As shown in FIG. 7, a window hole 48 that functions as an accommodation space is formed at a center of the track shoe connecting link 25, or in a portion that corresponds to the insertion holes 39. The height of the window hole 48 is set so as to increase toward the second shaft hole 32 from the first shaft hole 31. A thin reinforcing wall 48a is formed at an upper end portion of the window hole 48 that is adjacent to the first shaft hole 31. The shape of the window hole 48 makes the rigidity of the track shoe connecting link 25 to become smaller toward the second shaft hole 32 from the first shaft hole 31.

Therefore, according to the second embodiment, the following advantage is obtained in addition to the advantages obtained in the first embodiment.

(4) The window hole 48 is formed so as to correspond to the insertion holes 39. Therefore, the open portion is large in the track shoe connecting link 25. This reduces the weight of the track shoe connecting link 25.

Third Embodiment

Next, a third embodiment will now be described. The differences from the first embodiment will mainly be discussed.

Figure 8:
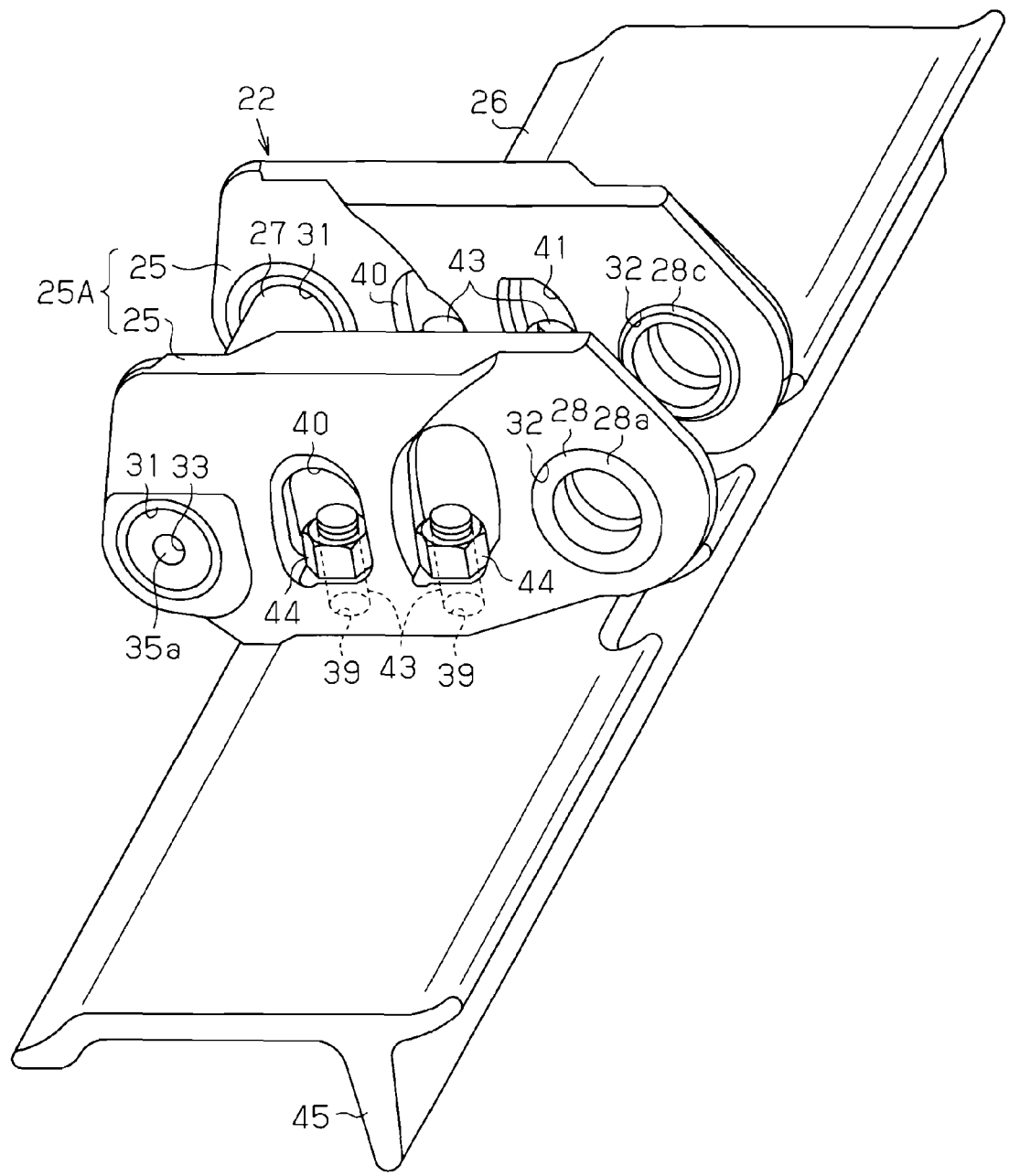
FIG. 8 is a perspective view showing a crawler belt assembly according to a third embodiment.

As shown in FIG. 8, the track shoe 26 is fixed to the connecting link pair 25A such that the grouser 45 is adjacent to the second shaft holes 32 of the track shoe connecting links 25. In other words, in the third embodiment, the connecting link pair 25A is provided up-side-down with respect to that of the first and second embodiments. The grouser 45 that faces a front direction or the moving direction of the crawler belt 21 is provided so as to correspond to the sleeves 28 that are adjacent to the open side of the connecting link pair 25A.

Accordingly, the third embodiment has the following advantage in addition to the advantages obtained in the first embodiment.

(5) Even if the open portion of the crawler belt assembly 22 having the three-side structure faces the front direction of the crawler belt 21, the grouser 45 reinforces the strength of the open portion of the crawler belt assembly 22. Therefore, the grouser 45 functions as reinforcing means of the connecting link pair 25A having the track shoe connecting links 25.

Fourth Embodiment

Next, a fourth embodiment will now be described. The differences from the first embodiment will mainly be discussed.

Figure 9:
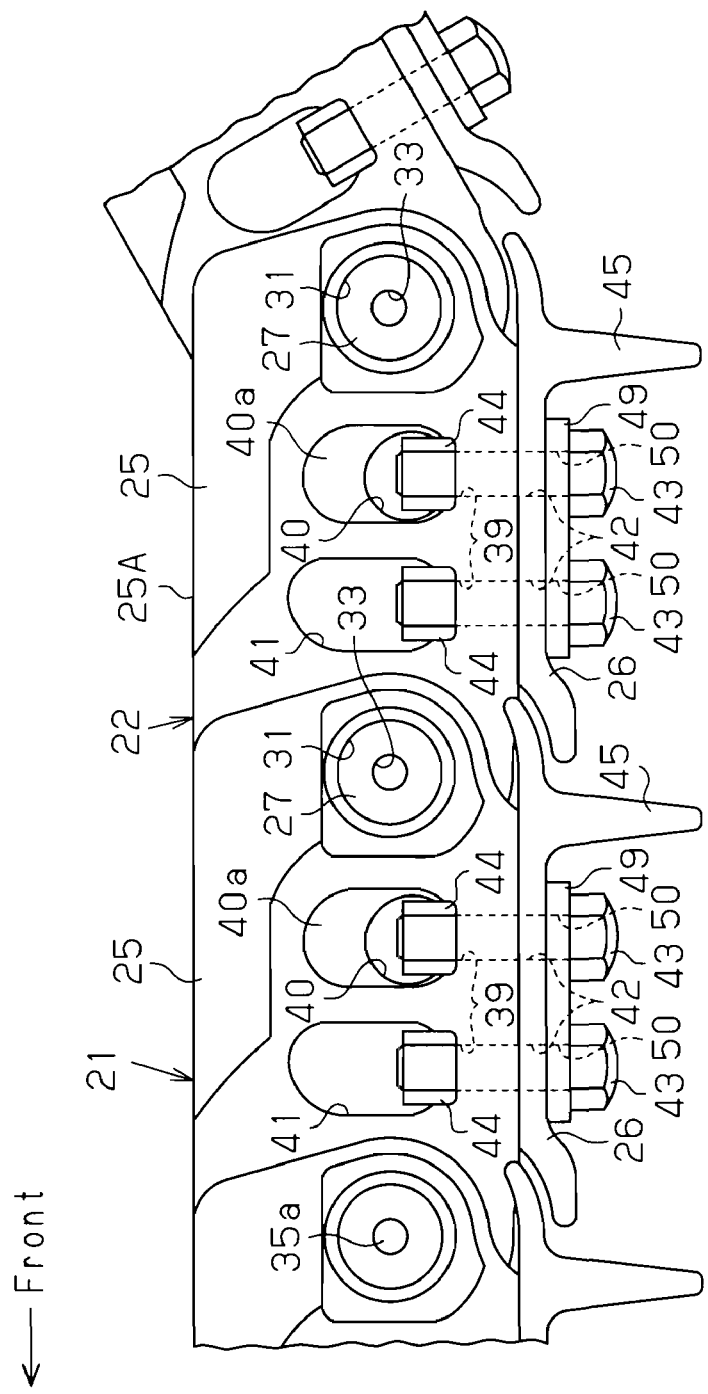
FIG. 9 is an enlarged front view showing a ground contacting portion of a crawler belt having a crawler belt assembly according to a fourth embodiment.
Figure 10:
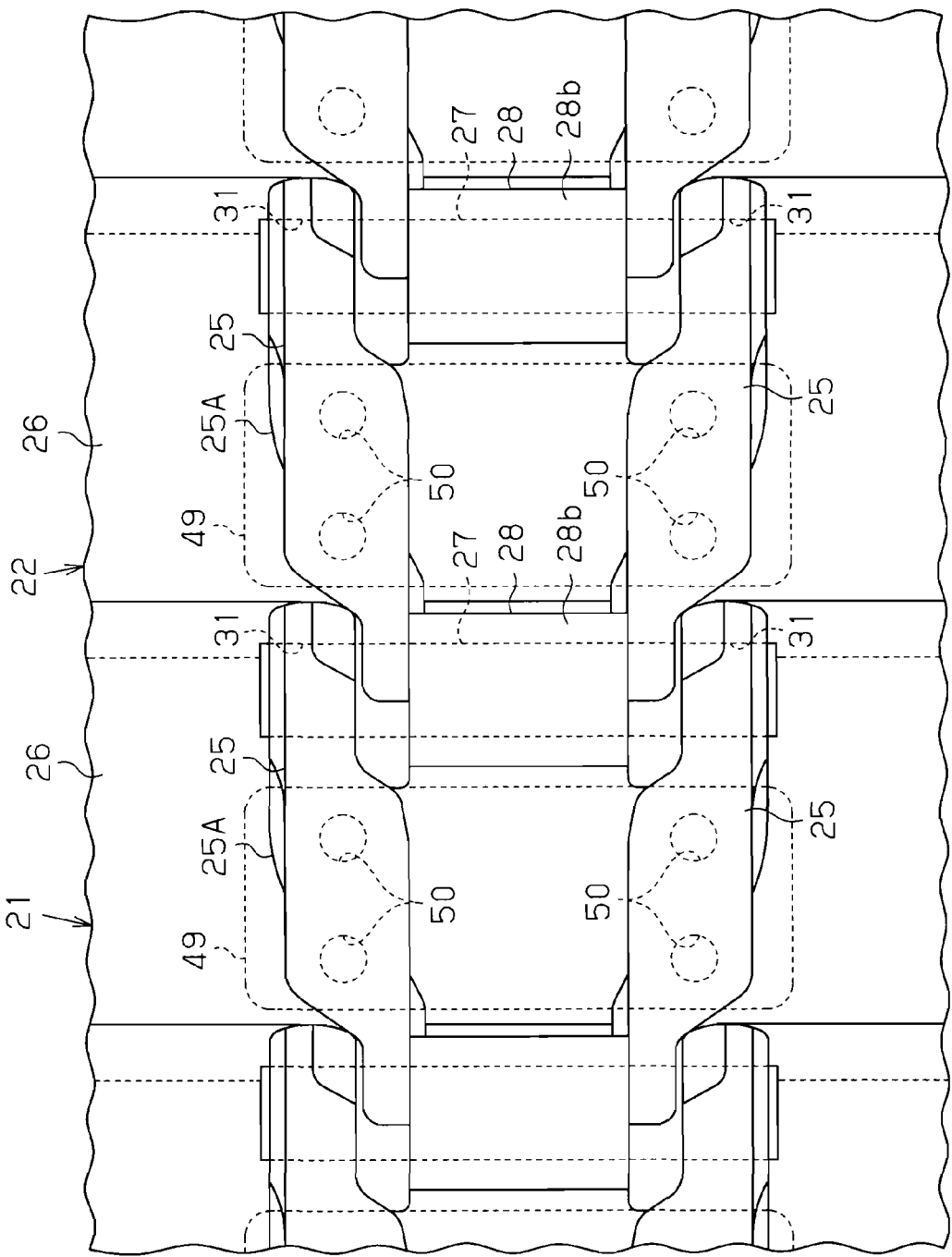
FIG. 10 is a plan view partially showing a crawler belt.
Figure 11:
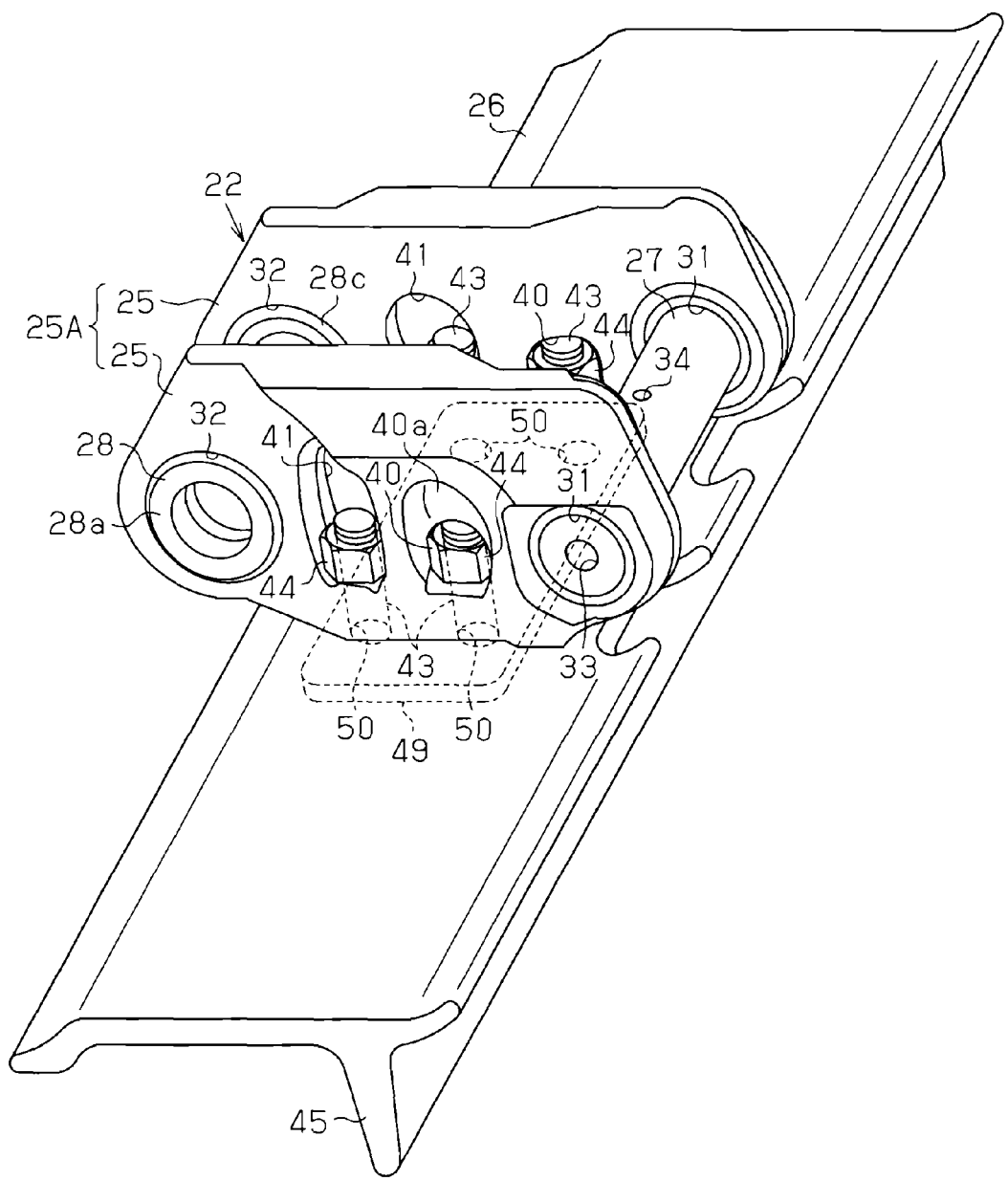
FIG. 11 is a perspective view showing a crawler belt assembly.

As shown in FIGS. 9 to 11, a reinforcing member 49 that is formed in a plate and functions as the reinforcing means is arranged on a lower surface (a surface that contacts a ground) of each track shoe 26. A pair of insertion holes 50 are formed in the reinforcing member 49. Each bolt 43 is inserted through the insertion hole 50 of the reinforcing member 49, the insertion hole 42 of the track shoe 26, and the insertion hole 39 of the track shoe connecting link 25. The nut 44 is screwed to the distal end of the bolt 43. Accordingly, the track shoe 26 and the reinforcing member 49 are fixed to the outer surface of the track shoe connecting link 25.

Accordingly, the fourth embodiment has the following advantage in addition to the advantages obtained in the first embodiment.

(6) The reinforcing member 49 increases the strength of the entire crawler belt assembly 22. This reinforces the connecting link pair 25A and prevents the damage of each track shoe connecting link 25 more effectively.

Fifth Embodiment

Next, a fifth embodiment will now be described. The differences from the first embodiment will mainly be discussed.

Figure 12:
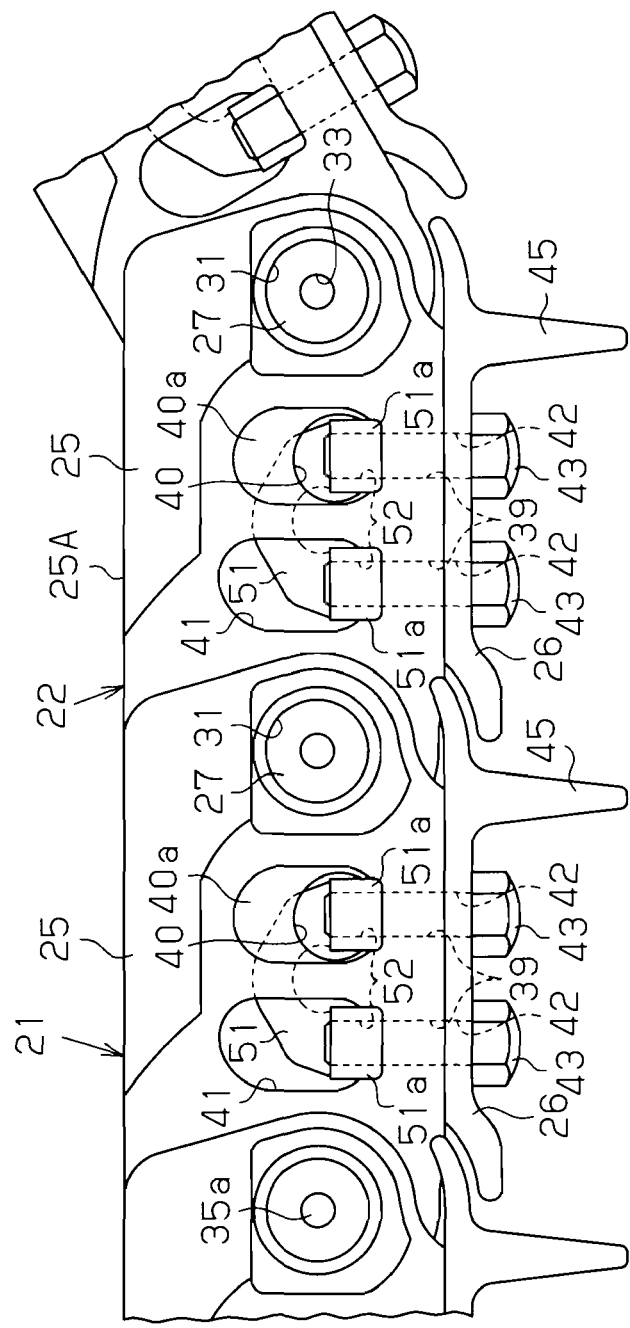
FIG. 12 is an enlarged front view showing a ground contacting portion of a crawler belt having a crawler belt assembly according to a fifth embodiment.
Figure 13:
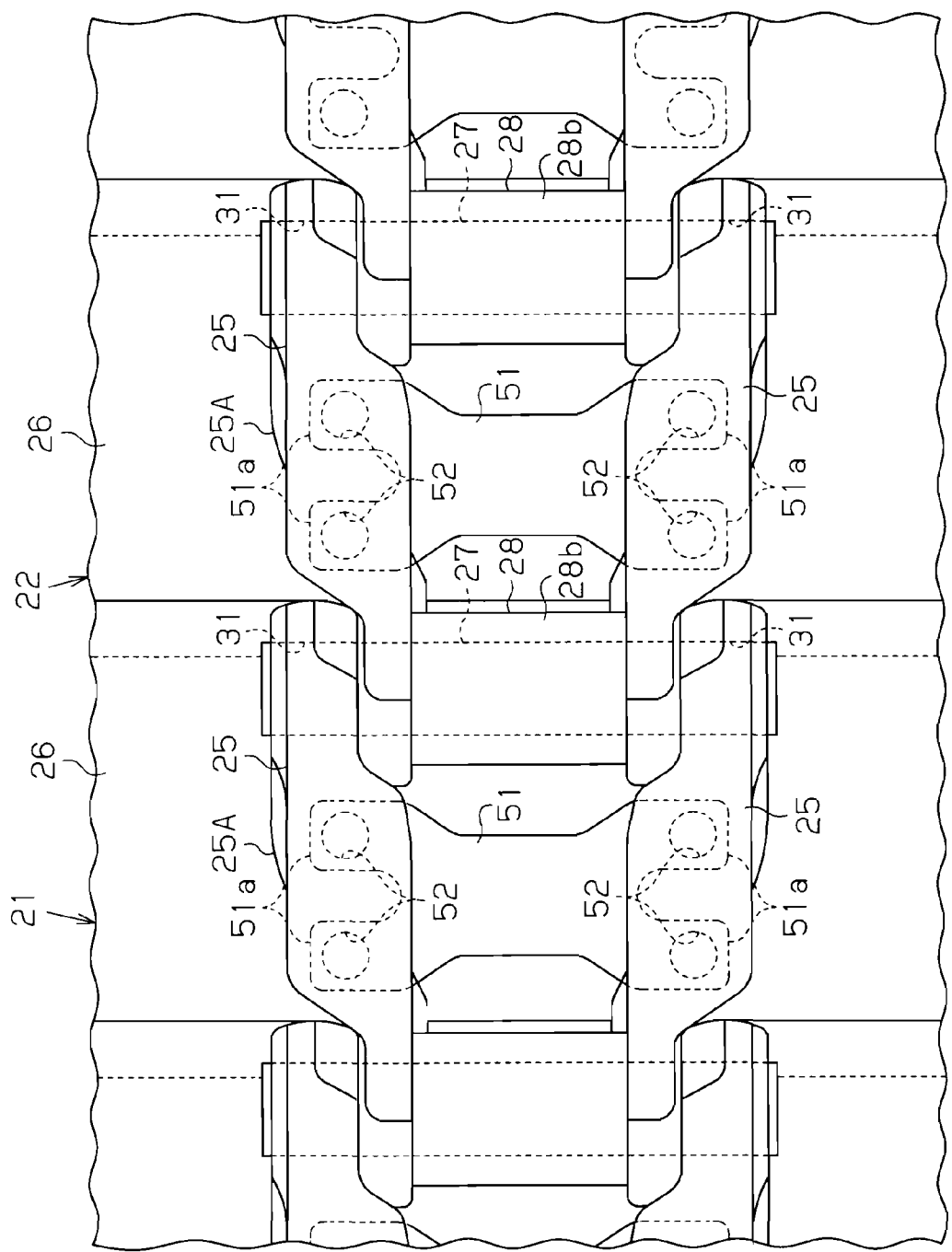
FIG. 13 is a plan view partially showing a crawler belt.
Figure 14:
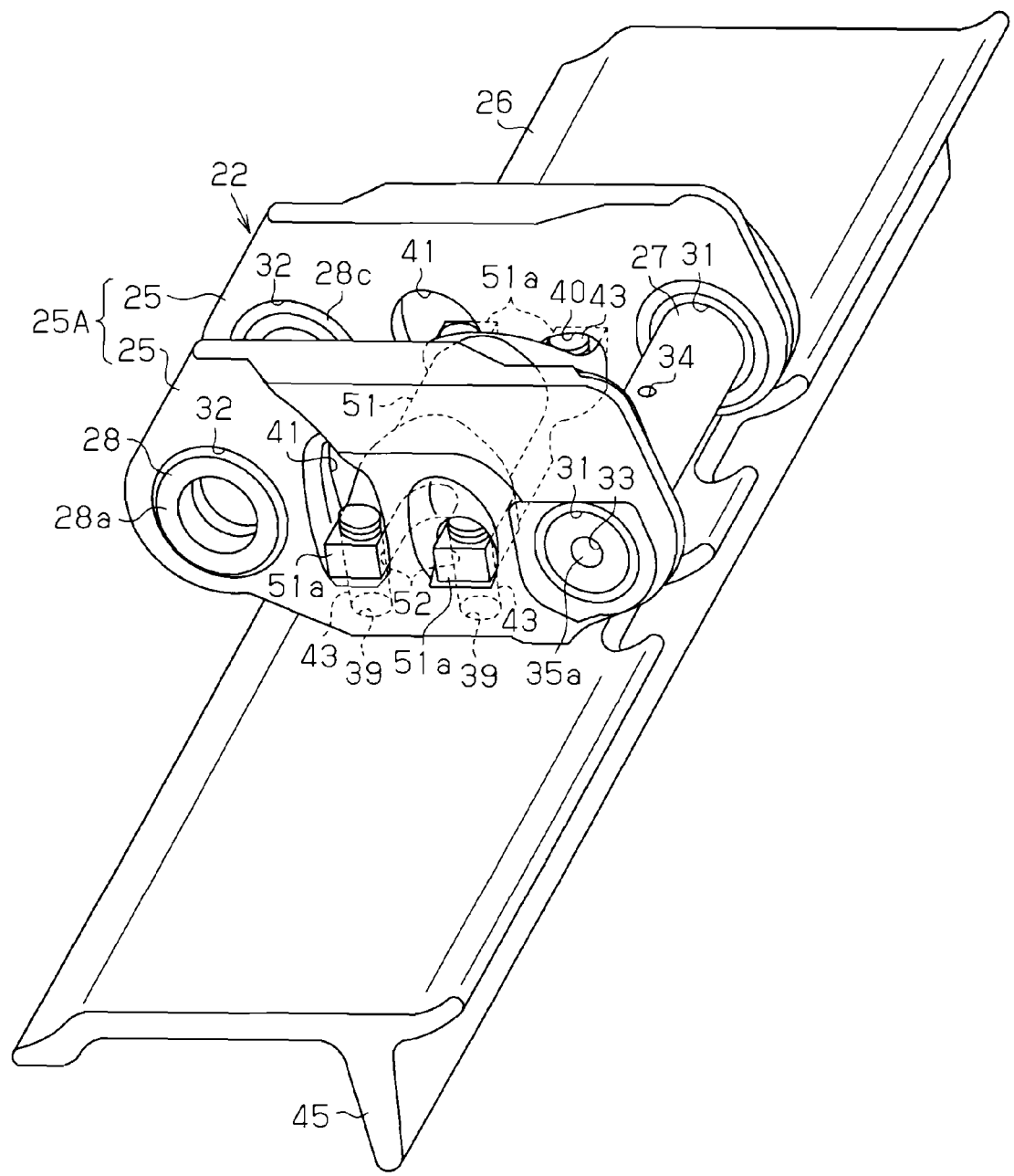
FIG. 14 is a perspective view showing a crawler belt assembly.

As shown in FIGS. 12 to 14, instead of the nuts 44 of the first embodiment, a reinforcing member 51, that functions as the reinforcing member, is provided apart from the track shoe 26 between the track shoe connecting links 25. The reinforcing member 51 has a pair of attaching portions 51a that are projected from the end portions and each of the attaching portions 51a is arranged in the corresponding window hole 40, 41 of the track shoe connecting links 25. A threaded hole 52 is formed in each attaching portion 51a. Each attaching portion 51a is arranged in each window hole 40, 41 and the bolt 43 that is inserted through the insertion hole 42 of the track shoe 26 and the insertion hole 39 of the track shoe connecting link 25 is screwed to the threaded hole 52 of each attaching portion 51a. Accordingly, the reinforcing member 49 is fixed to the outer surfaces of the track shoe connecting links 25.

Accordingly, the fifth embodiment has the following advantage in addition to the advantages obtained in the first embodiment.

(7) The reinforcing member 51 reinforces the connecting link pair 25A of the crawler belt assembly 22 and prevents the damage of each track shoe connecting link 25 more effectively.

Sixth Embodiment

Next, a sixth embodiment will now be described. The differences from the first embodiment will mainly be discussed.

Figure 15:
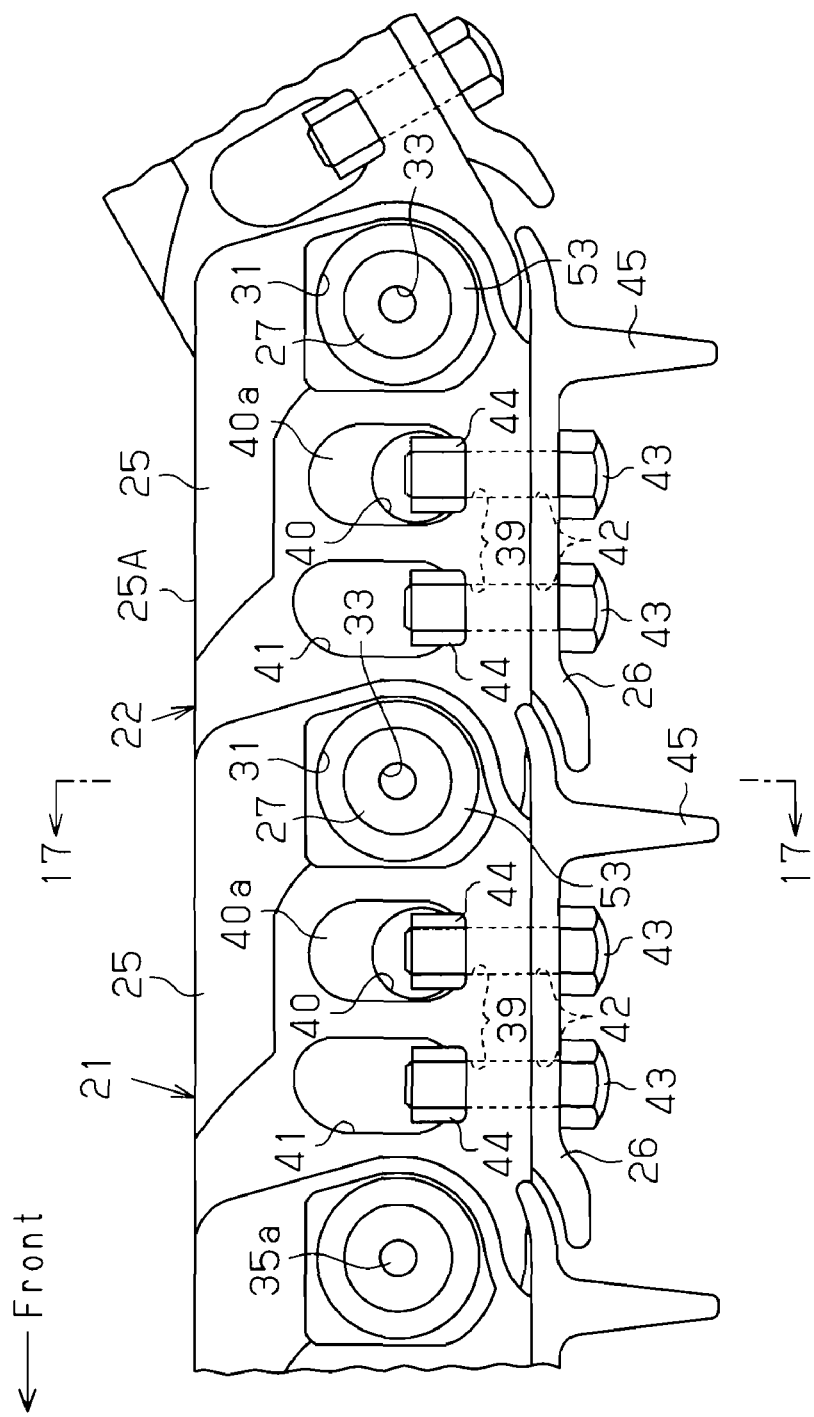
FIG. 15 is an enlarged front view showing a ground contacting portion of a crawler belt having a crawler belt assembly according to a sixth embodiment.
Figure 16:
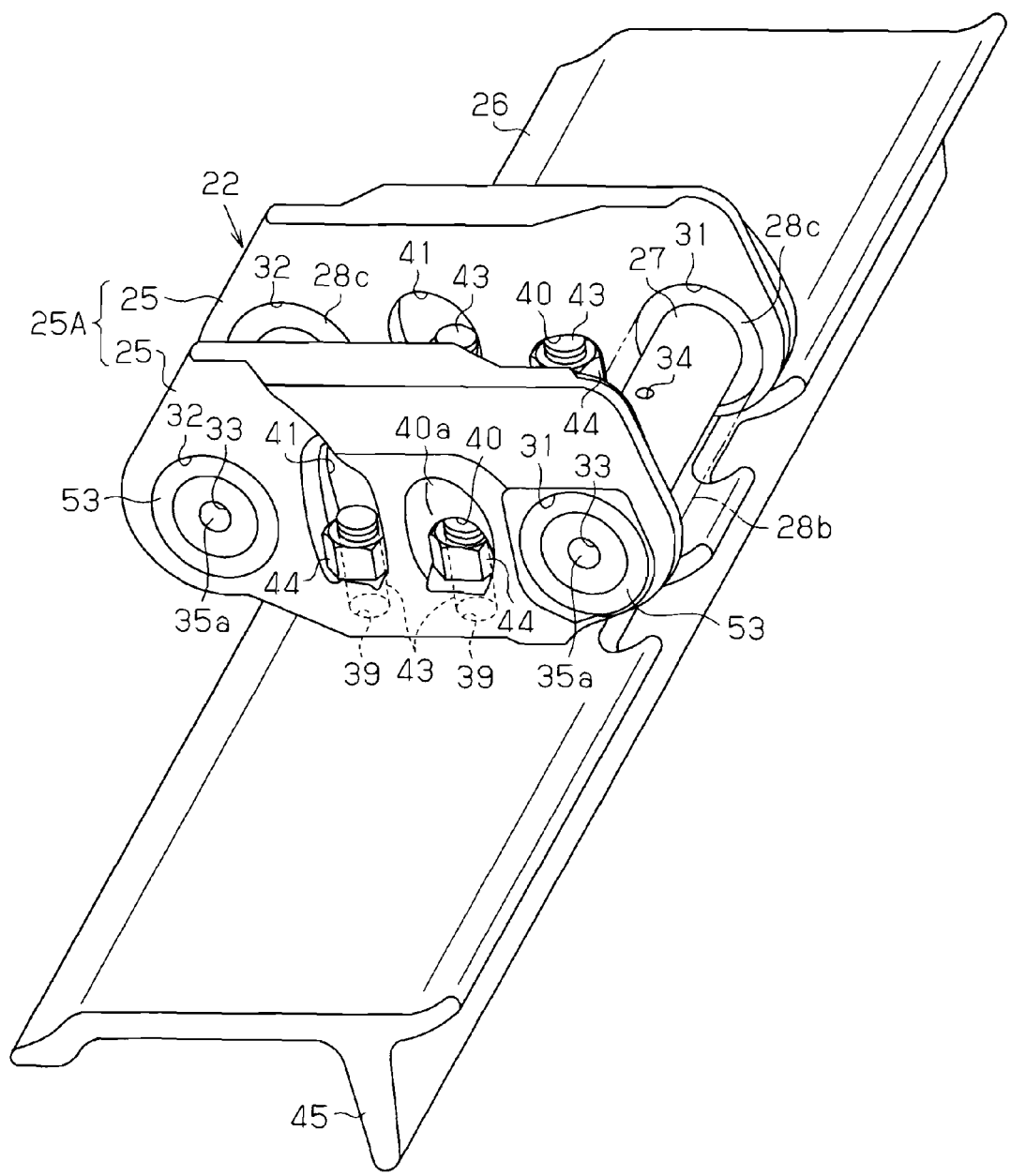
FIG. 16 is a perspective view showing a crawler belt assembly.
Figure 17:
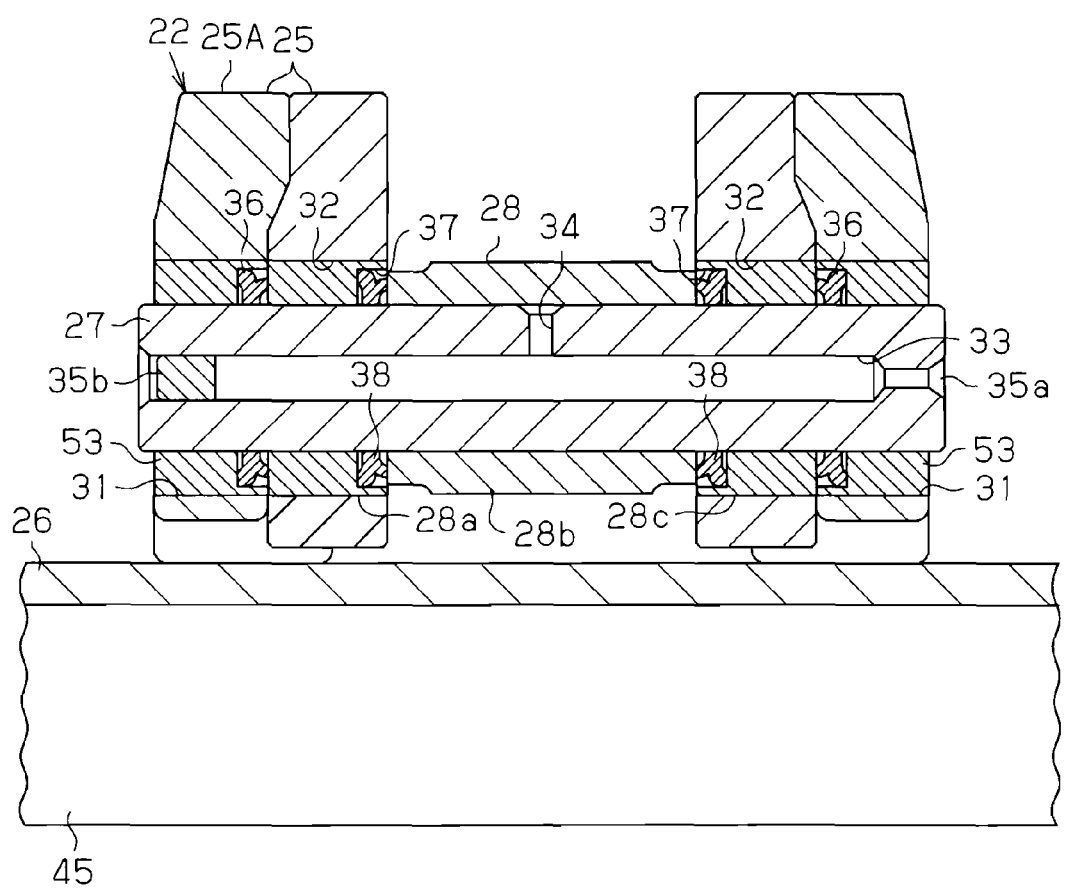
FIG. 17 a cross-sectional view of FIG. 15 taken along line 17-17.

As shown in FIGS. 15 to 17, the shaft holes 31, 32 provided on the two end portions of the track shoe connecting link 25 have a same diameter. A collar 53 is externally fitted to the two end portions of the support shaft 27. The collar 53 is fixed to an inner peripheral surface of the shaft hole 31. That is, the support shaft 27 is fixed to the inner peripheral surface of the shaft hole 31 of each track shoe connecting link 25 via the collar 53. The configuration of the sleeve 28 and the assembling of the two end portions 28a, 28c of the sleeve and the shaft holes 32 of the track shoe connecting link 25 are the same as those in each of the embodiments.

Accordingly, the sixth embodiment has the following advantage in addition to the advantages obtained in the first embodiment.

(8) The collar 53 is fixed to the two end portions of the support shaft 27. Therefore, the sleeve 28 is supported by the track shoe connecting link 25 in a state that the seal rings 36, 38 are provided between the sleeve 28 and the collar 53. That is, the sleeve 28 is provided integrally with the support shaft 27 and the collar 53. Therefore, when the crawler belt 21 is disassembled and assembled at the time of maintenance, the support shaft 27, the collar 53 and the sleeve 28 are handled as one part. The lubricant is prevented from leaking from the lubricant reserving hole 33 of the support shaft 27. Therefore, handling is easy at the time of maintenance.

The above embodiments may be modified as described below.

In each of the embodiments, other than the window holes 40, 41, 48 of the track shoe connecting link 25, for example, an end portion of the track shoe connecting link 25 that is opposite to a portion where the track shoe 26 is connected may be formed to be thick to adjust the rigidity of the track shoe connecting link 25.

In the first to third embodiments, one or both of the reinforcing members 49, 51 of the fourth and fifth embodiments may be provided to the crawler belt assembly 22.

In each of the embodiments, instead of the window holes 40, 41, 48, a recess that functions as an accommodation space may be formed on an outer surface of the track shoe connecting link 25.

The window holes 40, 41 may have the same open area and have different shapes such that the rigidity of the track shoe connecting link 25 becomes smaller toward the second shaft hole 32 from the first shaft hole 31.

In each of the embodiments, the insertion direction of the bolt 43 may be opposite. In this case, the head portion of the bolt 43 is positioned in the window hole 40, 41, 48 and the nut 44 is positioned on the outer surface of the track shoe 26.

What is claimed is:

1. A crawler belt assembly comprising:
a track shoe;
a pair of track shoe connecting links, each of the track shoe connecting links having a pair of end portions, a pair of shaft holes, a single shaft hole of the shaft holes being formed at a respective end portion of the track shoe connecting link and the shaft holes opening in a same direction, a plurality of insertion holes that are formed between the shaft holes and opens in a direction perpendicular to center axes of the shaft holes, the track shoe connecting link being fixed to the track shoe by bolts inserted through the insertion holes and nuts screwed to the bolts, a plurality of window holes each located at a position corresponding to one of the insertion holes, wherein the shaft holes have different diameters, the area of the window hole adjacent to the shaft hole of a larger diameter is greater than that of the other window hole adjacent to the shaft hole of a smaller diameter such that the track shoe connecting link has decreasing rigidity from the shaft hole of the smaller diameter toward the shaft hole of the larger diameter to control stress, the track shoe connecting links of the track shoe connecting link pair are parallel to each other;
a support shaft fixed to the shaft holes of the smaller diameter in the track shoe connecting links of the connecting link pair; and
a sleeve supported to the shaft holes of the larger diameter of the track shoe connecting links of the connecting link pair, the sleeve being externally fitted to the support shaft of an adjacent connecting link pair so as to be rotatable.

2. A crawler belt,
wherein the support shaft of the crawler belt assembly according to claim 1 is inserted through and supported by the shaft hole of the larger diameter of the adjacent crawler belt assembly in a state that the support shaft is externally fitted to the sleeve.

3. The crawler belt assembly according to claim 1 comprising:
reinforcing means for reinforcing the track shoe connecting links, the reinforcing means being provided between the track shoe connecting links.

4. The crawler belt assembly according to claim 3 comprising:
a grouser that is provided on an outer surface of the track shoe and extends along a side edge of the track shoe, the grouser being provided so as to correspond to the shaft holes of the larger diameter of the connecting link pair.

5. The crawler belt assembly according to claim 3,
wherein the reinforcing means is fixed to the connecting links by the bolts.

* * * * *